United States Patent
Shin et al.

(10) Patent No.: US 8,462,490 B2
(45) Date of Patent: Jun. 11, 2013

(54) MOBILE TERMINAL CASE, MOBILE TERMINAL HAVING THE SAME AND METHOD FOR MANUFACTURING MOBILE TERMINAL

(75) Inventors: Jongyeon Shin, Gyeonggi-do (KR); Jaemin Ryu, Gyeonggi-do (KR); Jaewook Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 12/961,356

(22) Filed: Dec. 6, 2010

(65) Prior Publication Data

US 2011/0317343 A1  Dec. 29, 2011

(30) Foreign Application Priority Data

Jun. 29, 2010  (KR) .................. 10-2010-0062250

(51) Int. Cl.
*H05K 5/00* (2006.01)

(52) U.S. Cl.
USPC ...................... 361/679.01; 455/19

(58) Field of Classification Search
USPC ............ 361/679.01, 800, 816, 818, 760, 361/777; 343/702; 455/19
See application file for complete search history.

(56) References Cited

U.S. PATENT DOCUMENTS

| | | | | |
|---|---|---|---|---|
| 5,178,722 A * | 1/1993 | Hoshino | ........................ | 216/20 |
| 6,061,028 A * | 5/2000 | Sakata | ........................... | 343/702 |
| 6,768,654 B2 * | 7/2004 | Arnold et al. | ................. | 361/818 |
| 7,561,047 B2 * | 7/2009 | Ogata et al. | ................ | 340/572.1 |
| 8,212,791 B2 * | 7/2012 | Kusuda et al. | ................ | 345/173 |
| 2003/0038174 A1 * | 2/2003 | Jones | ............................. | 235/380 |
| 2004/0051670 A1 * | 3/2004 | Sato | ............................. | 343/702 |
| 2004/0085253 A1 * | 5/2004 | Ngin | ............................ | 343/897 |
| 2005/0098347 A1 * | 5/2005 | Hwang et al. | ................. | 174/261 |
| 2006/0139901 A1 * | 6/2006 | Meireles et al. | ............. | 361/760 |
| 2006/0192714 A1 * | 8/2006 | Koyama et al. | ............... | 343/702 |
| 2006/0200983 A1 * | 9/2006 | Shimamura et al. | ............ | 29/847 |
| 2007/0115191 A1 * | 5/2007 | Hashiguchi et al. | ......... | 343/713 |
| 2007/0126643 A1 * | 6/2007 | Park et al. | ...................... | 343/702 |
| 2007/0164905 A1 * | 7/2007 | Lempkowski et al. | ...................... | 343/700 MS |
| 2007/0235213 A1 * | 10/2007 | Lee et al. | ...................... | 174/255 |
| 2007/0241971 A1 * | 10/2007 | Tsujimura et al. | ............ | 343/702 |
| 2008/0158091 A1 * | 7/2008 | Imaoka et al. | ................ | 343/851 |
| 2008/0297422 A1 * | 12/2008 | Ishida | ........................... | 343/702 |
| 2009/0009941 A1 * | 1/2009 | Hsu et al. | ...................... | 361/681 |
| 2009/0015488 A1 * | 1/2009 | Jow et al. | .............. | 343/700 MS |
| 2009/0015490 A1 * | 1/2009 | Honda et al. | .................. | 343/702 |
| 2009/0058737 A1 * | 3/2009 | Tsujimura et al. | ............ | 343/702 |
| 2009/0066588 A1 * | 3/2009 | Cheng et al. | .................. | 343/702 |
| 2009/0091501 A1 * | 4/2009 | Mizoroki et al. | ............. | 343/702 |
| 2009/0218950 A1 * | 9/2009 | Hong et al. | ..................... | 315/85 |
| 2009/0219259 A1 * | 9/2009 | Kwon | ............................ | 345/173 |
| 2009/0284904 A1 * | 11/2009 | Wu et al. | .................. | 361/679.01 |
| 2009/0303691 A1 * | 12/2009 | Choi | ............................. | 361/768 |
| 2011/0298670 A1 * | 12/2011 | Jung et al. | ..................... | 343/702 |

* cited by examiner

*Primary Examiner* — Adrian S Wilson
*Assistant Examiner* — Abhishek Rathod
(74) *Attorney, Agent, or Firm* — Lee, Hong, Degerman, Kang & Waimey (57) ABSTRACT

Disclosed is a mobile terminal case, a mobile terminal having the same, and a method of manufacturing a mobile terminal case, and the mobile terminal may include a case forming an external shape with a curved surface, and a film member mounted on the case, wherein the film member may include a base film combined with the case and made of a synthetic resin material, and a metal film mounted on a surface of the base film and at least part of which is formed to correspond to the curved surface.

15 Claims, 11 Drawing Sheets

MOBILE TERMINAL CASE, MOBILE TERMINAL HAVING THE SAME AND METHOD FOR MANUFACTURING MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0062250, filed on Jun. 29, 2010, the contents of which is incorporated by reference herein in its entirety.

BACKGROUND OF THE INVENTION

1. Field of the Invention

The present invention relates to a mobile terminal case having a metallic material formed with a color layer, a mobile terminal having the same, and a method of manufacturing a mobile terminal case.

2. Description of the Related Art

Terminals may be divided into a mobile/portable terminal and a stationary terminal according to their mobility. The mobile terminal may then be divided into a handheld terminal and a vehicle mounted terminal according to whether it can be directly carried by a user.

As the functions becomes diversified, the terminal is implemented in the form of a multimedia player having complicated functions such as capturing still or moving images, playing music or video files, receiving broadcast signals, and the like.

In order to implement such complicated functions of a multimedia player, various new attempts have been applied in the aspect of the hardware or software. As an example, a user interface environment is provided to allow the user to easily and conveniently retrieve or select the functions.

Furthermore, as being considered as a personal belonging for expressing his or her own personality, various design forms are required for the mobile terminal. A mobile terminal case is one of such design forms. The use of color being expressed on a mobile terminal case may be considered as a means of satisfying the design requirement for the mobile terminal case.

SUMMARY OF THE INVENTION

An object of the present invention is to provide a case capable of is implementing the feeling of metallic texture and various color effects and a mobile terminal having the same.

Furthermore, another object of the present invention is to provide a mobile terminal case having a high degree of freedom for product implementation and a mobile terminal having the same.

In order to accomplish the foregoing objectives, a mobile terminal associated with the present invention may include a case forming an external shape with a curved surface, and a film member mounted on the case, wherein the film member may include a base film combined with the case and made of a synthetic resin material, and a metal film mounted on a surface of the base film and at least part of which is formed to correspond to the curved surface.

As an example associated with the present invention, the base film may be made of a light transmittance, and a penetration region for penetrating at least part of the metal film may be formed on the metal film. A printed layer disposed between the base film and the case to be exposed through the penetration region may be formed on the other surface of the base film.

As another example associated with the present invention, the penetration region may include a through hole penetrating the metal film and forming a predetermined pattern on a surface of the metal film. The metal film may be formed to cover the curved surface, and the penetration region may be disposed at a position deviated from the curved surface. The curved surface may be formed on at least one of both ends of the case.

As another example associated with the present invention, an oxide film may be formed on a surface of the metal film, and the oxide film may be formed to penetrate a portion corresponding to the penetration region to expose the printed layer. The oxide film and printed layer may be formed with different colors, and a predetermined pattern may be formed on the printed layer, and a boundary of a portion corresponding to the pattern of the penetration region may constitute a loop for limiting the predetermined pattern.

As another example associated with the present invention, a second metal film formed with an antenna pattern may be mounted on the other surface of the base film to transmit and receive wireless signals, and a second penetration region may be formed on the metal film to correspond to the antenna pattern. The mobile terminal may include a connecting pin with a conductive material for penetrating the case. The connecting pin may electrically connect the antenna pattern to a circuit board for processing the wireless signals. The second penetration region may be filled with paint or ink to cover at least one of the antenna pattern and connecting pin.

As another example associated with the present invention, the printed layer may include a conductor, and a second metal film formed with an antenna pattern may be disposed on a surface of the printed layer to transmit and receive wireless signals, and a second penetration region may be formed on the metal film to correspond to the antenna pattern.

As another example associated with the present invention, the printed layer is formed on the second metal film, and an oxide film is formed on a surface of the metal film, and at least part of the oxide film may be penetrated to correspond to the penetration region.

As another example associated with the present invention, a film member may include an adhesive layer formed between the base film and metal film to adhere the base film to the metal film. The base film and metal film may be compressed to be combined with each other by interposing the adhesive layer therebetween.

As another example associated with the present invention, a boundary surface in a state of being combined with each other by coagulation after dissolution may be formed between the base film and the case. The printed layer further may include a binder resin for adhering the base film to the case at the time of coagulation.

In addition, according to the present invention, there is disclosed a mobile terminal case including a case forming an external shape with a curved surface, and a film member mounted on the case, and the film member may include a base film made of a synthetic resin material and formed to cover the case to be integrated with the case if the case is coagulated in a dissolved state, and a metal film mounted on a surface of the base film and at least part of which is formed to correspond to the curved surface.

As another example associated with a mobile terminal case according to the present invention, the base film may be made of a light transmittance material, and a printed layer may be formed on the other surface of the base film, and a penetration region may be formed on the metal film to expose the printed layer.

As another example associated with the present invention, the penetration region may be formed at a position deviated from the curved surface. The film member may include an oxide film formed on a surface of the metal film, and penetrated through a portion corresponding to the penetration region to expose the printed layer.

In addition, according to the present invention, there is disclosed a method of manufacturing a mobile terminal case. The manufacturing method may include combining a metal film having a metallic material with a surface of a base film having a synthetic resin material using lamination to produce a film member, printing ink on the other surface of the base film to form a printed layer on the base film, forming the film member to correspond to a shape of the case, and injection-molding the case in a state that the formed film member is inserted in a mold.

As another example associated with the present invention, the manufacturing method may include anodizing the metal film to form an oxidation film on a surface of the metal film, and etching the metal film to form a penetration region for exposing the printed layer to the outside.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a portable electronic apparatus associated with the present invention will be described in more detail with reference to the accompanying drawings. The suffixes "module" and "unit or portion" for components used in the following description merely provided only for facilitation of preparing this specification, and thus they are not granted a specific meaning or function. This specification employs like/similar reference numerals for like/similar components irrespective of different embodiments, so they all will be understood by the first description. The expression in the singular form in this specification will cover the expression in the plural form unless otherwise indicated obviously from the context.

Mobile terminals described in the present invention may include mobile phones, smart phones, laptop computers, digital broadcasting terminals, personal digital assistants (PDAs), portable multimedia players (PMPs), navigators, and the like.

Figure 1:
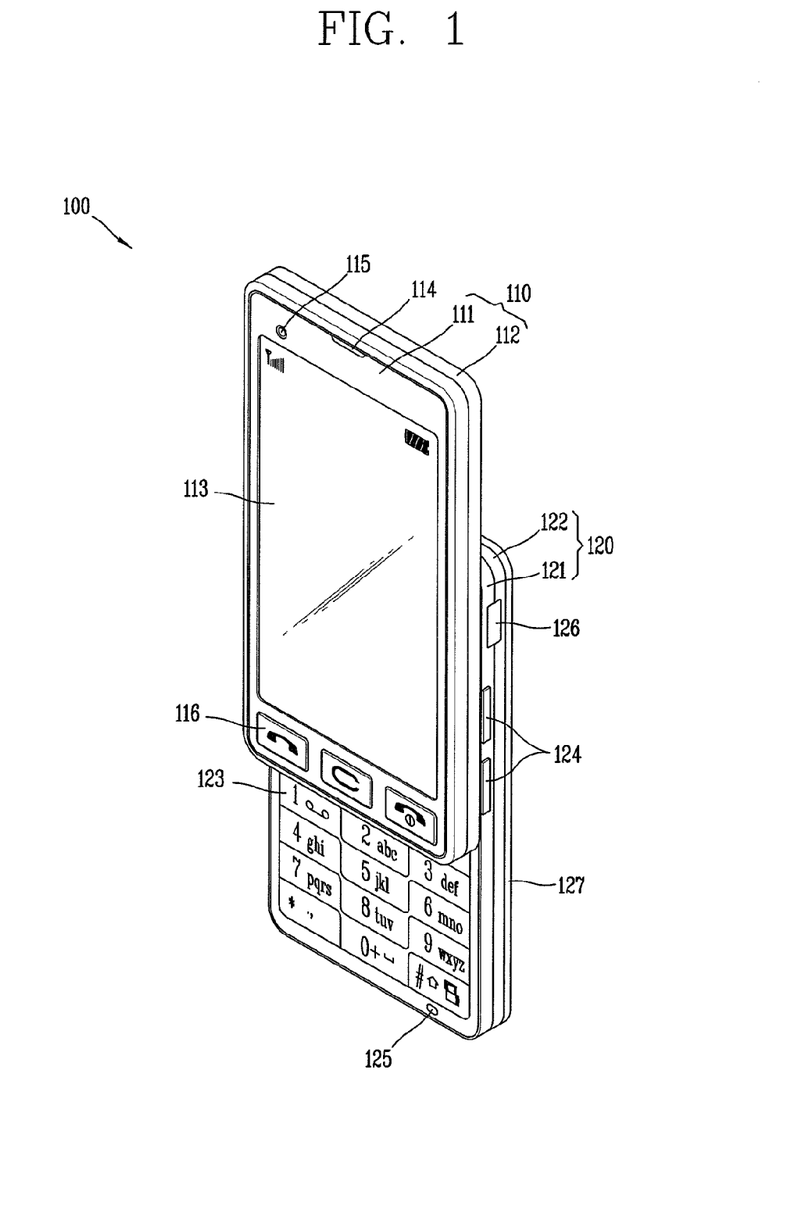
FIG. 1 is a perspective view illustrating a mobile terminal according to an embodiment of the present invention.

FIG. 1 is a perspective view illustrating a mobile terminal according to an embodiment of the present invention.

A main body (hereinafter, referred to as 'body') of a mobile terminal 100 may include a first body 110 and a second body 120 slidably moved along at least one direction on the first body 110. Here, the present invention will not be limited to the configuration, but may be also applicable to various types of mobile terminals, such as bar type, folder type, swing type, swivel type and the like.

The state in which the first body 110 is positioned over the second body 120 may be referred to as a closed configuration, and the state in which the first body 110 exposes at least part of the second body 120, as shown in the drawing, may be referred to as an open configuration.

In addition, the mobile terminal may be mainly operable in a standby (idle) mode when in the closed configuration, but this mode may be released by the user's manipulation. Also, the mobile terminal may be mainly operable in a phone call mode in the open configuration, but this mode may also be changed into the idle mode according to the user's manipulation or after passing a certain period of time.

A case (housing, casing, cover, etc.) forming the outside of the first body 110 is formed by a front case 111 and a rear case 112. In addition, various is electronic components may be disposed in a space between the front case 111 and the rear case 112. At least one intermediate case may additionally be disposed between the front case 111 and the rear case 112. Further, the cases can be formed of resin in a manner of injection molding, or formed using metallic materials such as stainless steel (STS) and titanium (Ti).

A display unit 113, an audio output unit 114, a first video input unit 115 or a first manipulation unit 116 may be disposed on the first body 110, particularly, on the front case 111.

The display unit 113 may be configured to display visible information, examples of which include a liquid crystal display (LCD) module, an organic light emitting diodes (OLED) module, a transparent OLED (TOLED) and the like.

The display unit 113 may further include a touch sensor so as to allow a user to perform a touch input. The display unit 113 may be configured to generate various tactile effects which a user can feel upon a touch input. Such function can be implemented by employing a haptic module cooperating with the display unit 113. The haptic module can generate tactile effects, representatively, a vibration. Such haptic module may be disposed in various ways depending on the configuration of the mobile terminal 100 as well as the configuration of the display unit 113.

The audio output unit 114 may be configured as a receiver or a speaker.

The first video input unit 115 may be a camera module for allowing a user to capture images or video.

The first manipulation unit 116 may receive a command input to control the operation of the mobile terminal 100. The first manipulation unit 116 may be formed as a touch screen together with the display unit 113.

Similar to the first body 110, a front case 121 and a rear case 122 may configure a case of the second body 120.

A second manipulation unit 123 may be disposed at the second body 120, more particularly, at a front face of the front case 121.

A third manipulation unit 124, a first audio input unit 125 and an interface 126 may be disposed on at least one of the front case 121 and the rear case 122.

The first to third manipulation units 116, 123 and 124 can be commonly referred to as a manipulation portion, which can be manipulated in any tactile manner that user can make a touch input.

For example, the manipulation portion can be implemented as a dome switch or touchpad which can receive information or commands input by a user in a pushing or touching manner, or implemented in a manner of using a wheel, a jog or a joystick to rotate keys.

From a functional viewpoint, the first manipulation unit 116 can be used for inputting commands such as START, END, SCROLL or the like, and the second manipulation unit 123 can be used for inputting numbers, characters, symbols, or the like. Also, the third manipulation unit 124 can function as a hot key for activating a specific function, such as activation of the first video input unit 115.

The first audio input unit 125 may be configured as a microphone so as to receive user's voice, other sounds and the like.

The interface 126 may interface the mobile terminal 100 and external devices so as to allow data exchange therebetween or the like. For example, the interface 126 may be at least one of a wired/wireless access terminal for earphones, a short-range communication port (e.g., IrDA port, Bluetooth port, wireless LAN port, and the like), and power supply terminals for supplying power to the mobile terminal.

The interface 126 may be a card socket for accommodating an external card such as Subscriber Identification Module (SIM), User Identity Module (UIM), memory card for storing information, or the like.

Figure 2:
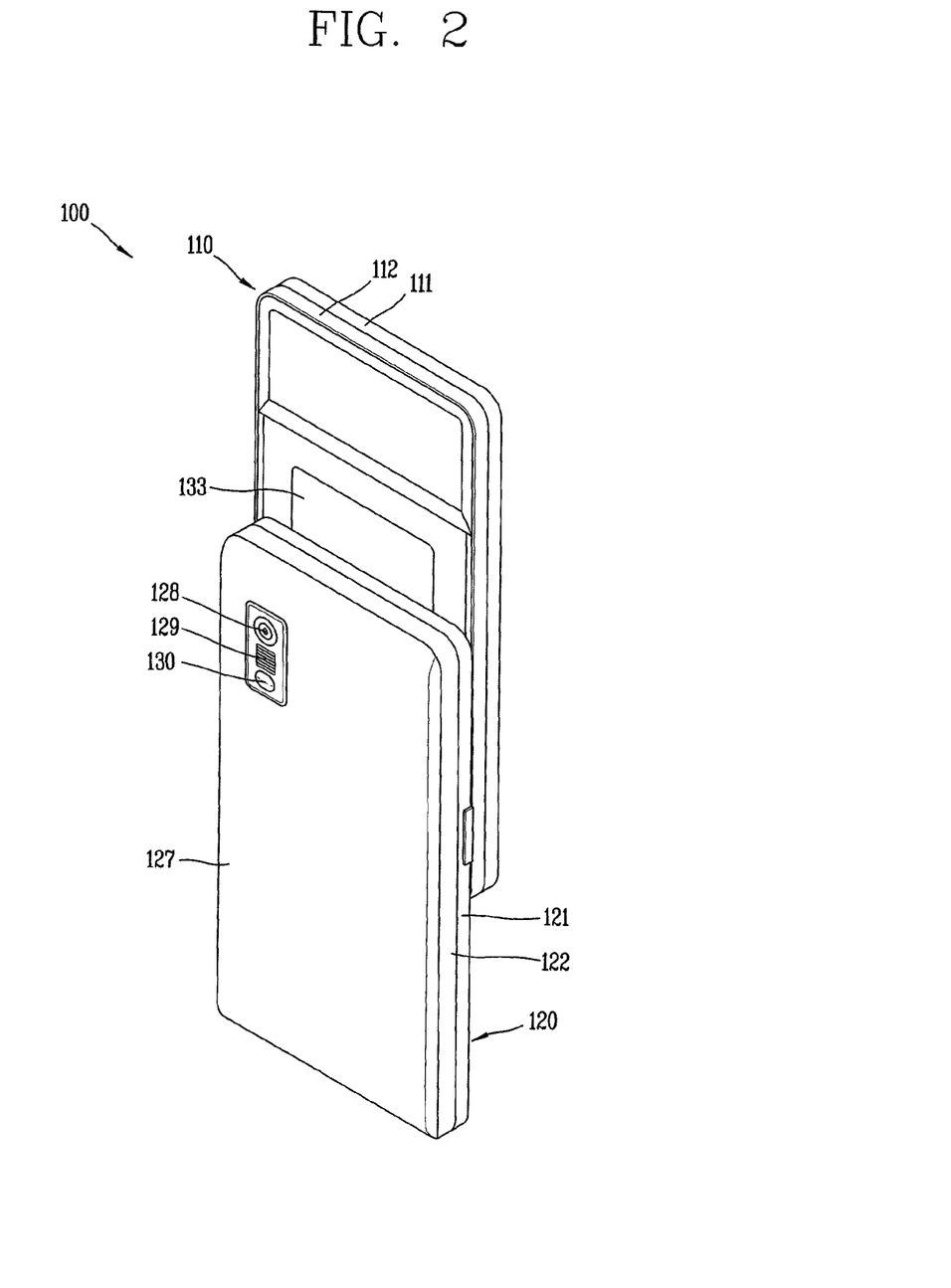
FIG. 2 is a rear perspective view illustrating a mobile terminal according to an embodiment of the present invention.

FIG. 2 is a rear perspective view illustrating a mobile terminal of FIG. 1.

Referring to FIG. 2, a second video input unit 128 may be additionally mounted on the rear case 122 of the second body 120. The second video input unit 128 faces a direction which is substantially opposite to a direction faced by the first video input unit 115 (see FIG. 1). Also, the second video input unit 128 may be a camera having a different number of pixels from that of the first video input unit 115.

For example, the first video input unit 115 may operate with a relatively lower number of pixels (lower resolution). Thus, the first video input unit 115 may be useful when a user can capture his face and send it to another party during a video call or the like. On the other hand, the second video input unit 128 may operate with a relatively higher number of pixels (higher resolution) such that it can be useful for a user to obtain higher quality pictures for later use.

A flash 129 and a mirror 130 may be additionally disposed adjacent to the second video input unit 128. The flash 129 operates in conjunction with the second video input unit 128 when taking a picture using the second video input unit 128. The mirror 130 can cooperate with the second video input unit 128 to allow a user to photograph the user himself or herself in a self-portrait mode.

As described above, it has been described that the second video input unit 128 is disposed at the second body 120; however, the present invention may not be limited to the configuration. It is also possible that one or more of those components (e.g., 128 to 130), which have been described to be implemented on the rear case 122, such as the second video input unit 128, will be implemented on the first body 110, particularly, on the rear case 112. In this configuration, the component(s) disposed on the rear case 112 can be protected by the second body 120 in a closed configuration of the mobile terminal. In addition, without the second video input unit 128, the first video input unit 115 can be implemented to be rotatable so as to rotate up to a direction which the second video input unit 128 faces.

A second audio output unit may be additionally disposed at the rear case 122.

The second audio output unit can cooperate with the first audio output unit 114 (see FIG. 1) to provide stereo output. Also, the second audio output unit may be configured to operate as a speakerphone.

An antenna for Bluetooth communication, GPS communication or the like may be disposed at a terminal body. At the rear case 122 may be disposed a broadcast signal receiving antenna, as well as an antenna for call communications or the like. The antenna may be provided in a retractable manner on the terminal body.

Part of a slide module 133 for slidably combining the first body 110 with the second body 120 may be disposed at the rear case 112 of the first body 110. Another part of the slide module 133 may be disposed at the front case 121 of the second body 120, so as not to be exposed to the outside as shown in the drawing.

A power supply unit 127 for supplying power to at least one element of the mobile terminal 100 may be disposed at the rear case 122. The power supply unit 127 may include a rechargeable battery 135 (see FIG. 3) to supply power, for example. The battery 135 may be detachably combined therewith for charging or the like.

Figure 3:
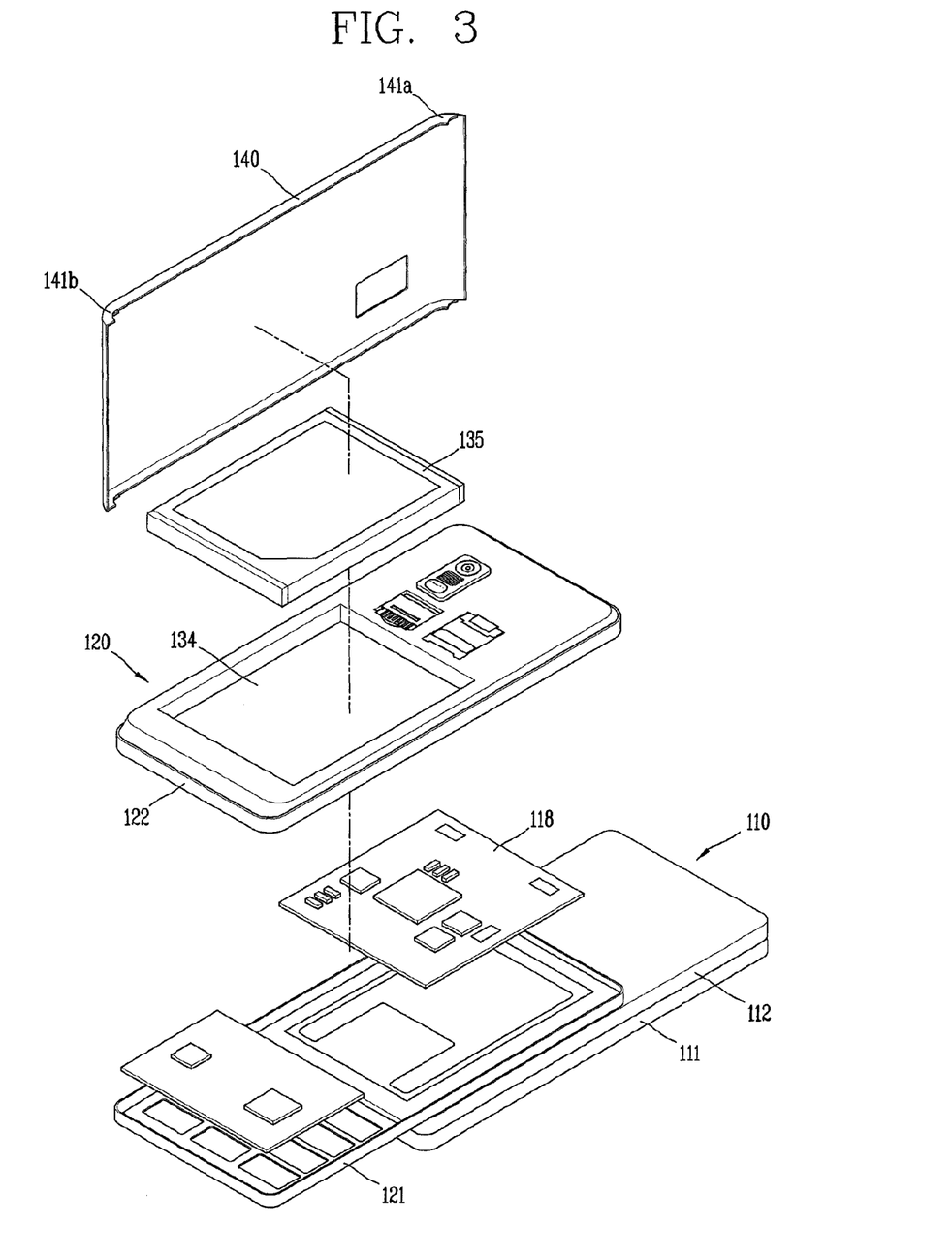
FIG. 3 is an exploded view illustrating one configuration of the mobile terminal in FIG. 2.
Figure 4:
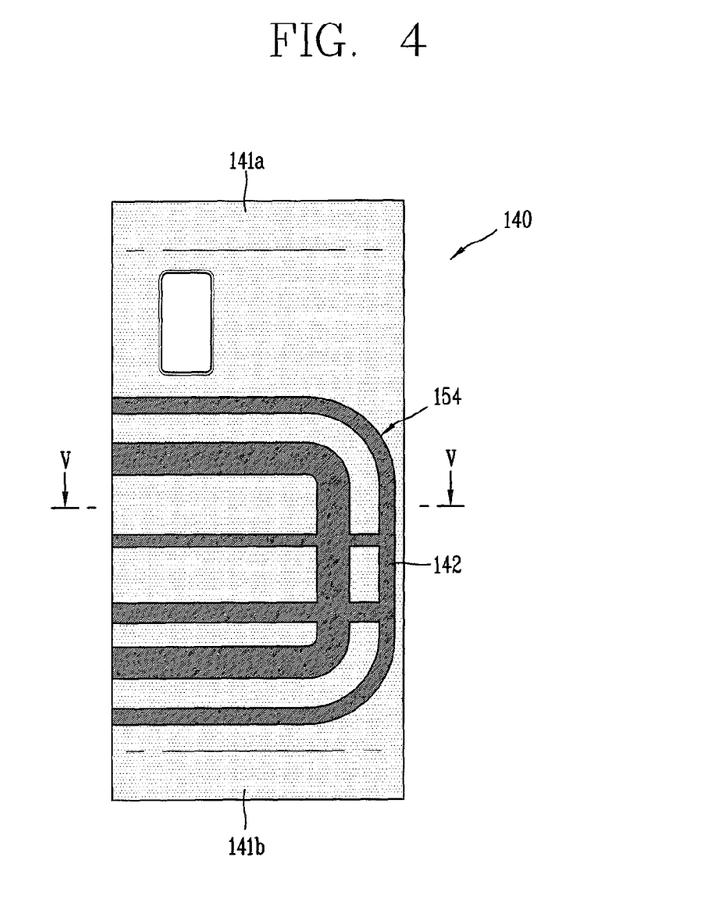
FIG. 4 is a rear view of a battery cover in FIG. 3.
Figure 5:
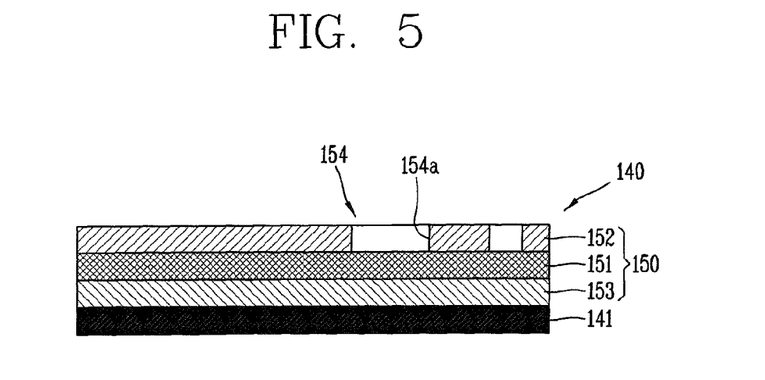
FIG. 5 is a cross-sectional view taken along the line V-V of FIG. 4.

FIG. 3 is an exploded view illustrating one configuration of the mobile terminal in FIG. 2, and FIG. 4 is a rear view of a battery cover in FIG. 3, and FIG. 5 is a cross-sectional view taken along the line V-V of FIG. 4.

Referring to the drawings, a recessed-type accommodation chamber 134 is formed on the rear case 122. The accommodation chamber 134 is formed in a size corresponding to the exterior of the battery 135 to allow the battery 135 to be placed therein. A connection terminal to be connected with the front case 121 may be provided in the accommodation chamber 134, and the battery 135 is connected thereto to supply power to the circuit board 118 mounted on the front case 121. The accommodation chamber 134 and battery 135 may constitute a power supply unit 127 (see FIG. 11).

As illustrated in the drawing, a cover 140 for covering the accommodation chamber 134 in an opening and closing manner is mounted on the second body 120, specifically, the rear case 122. The cover 140 may be a structure in which a film member 150 is mounted on a case 141 forming the exterior of the second body 120. However, the present invention is not necessarily limited to this, and other cases 111, 112, 121, 122 may be formed with the same structure as the cover.

Referring to FIGS. 4 and 5, the film member 150 is mounted on the case 141.

The case 141 forms an external shape of the second body 120, and for example, it may be an injection-molded product having a synthetic resin material manufactured by injection-molding. Accordingly, the cover 140 may be manufactured at low cost with a high degree of freedom in the product exterior and interior shape, regardless of the complexity of the shape.

Referring to the drawing, a pattern 142 having a different color from the base color is formed on an outer surface of the cover 140. The base color may be a color with metallic texture, and the different color may be a color produced by printing. The plurality of color senses may be implemented by the film member 150.

Referring to FIG. 5, the film member 150 may include a base film 151 and a metal film 152.

The base film 151 is made of a light transparent synthetic resin, and combined with the case 141. For example, the base film 151 is formed to cover a main surface of the case 141, and may be integrated with the case 141 if the case is coagulated in a dissolved state. Insert injection molding may be used as a manufacturing method for implementing the combination.

The metal film 152 is mounted on a surface of the base film 151. The metal film 152 is made of a thin film having a metallic material such as aluminum, titanium, and the like. The metal film 152 and base film 151 may be adhered by compression or the like, and an adhesive layer (not shown) may be formed between the metal film 152 and base film 151 to adhere both of them. For such a compression process, lamination for combining the metal film 152 with the base film 151 using a roller can be used, and the adhesive layer may include a binder for lamination.

If the cover 140 is injection-molded in a state that the film member 150 is inserted in a mold, then the base film 151 is dissolved together with the case 141 and then coagulated, and through the process, the film member 150 is mounted on the case 141. According to the drawing, the case 141 is formed with a curved surface 141a, 141b, and the metal film 152 is formed such that part of the metal film 152 corresponds to the curved surface 141a, 141b. If the metal film 152 is independently inserted in the mold, then it may be difficult to manufacture a curved shape, but it may be possible to manufacture a more accurate curved shape as the base film 151 is used as a medium in this manner.

Referring to FIG. 5, a boundary surface in a state of being combined with each other by coagulation after dissolution is formed between the base film 151 and the case 141. Moreover, the base film 151 and case 141 may be formed with the same material, and through this, the base film 151 of the film member 150 may be integrated with the case 141 without any boundary therebetween.

According to the drawing, the film member 150 may include a printed layer 153 formed to cover the other surface of the base film 151 (a surface opposite to the surface combined with the metal film).

The printed layer 153 may be formed by printing ink on the other surface of the base film 151. Printing may be implemented through pad printing, spray printing, or the like, and the printed layer 153 is disposed between the base film 151 and the case 141.

The printed layer 153 may include a binder resin (not shown). The binder resin serves to adhere ink to the other surface of the base film 151, and moreover, serves to adhere the base film 151 to the case 141 at the time of molding, more specifically, coagulation of the case 141.

Referring to FIGS. 4 and 5, the metal film 152 is provided with a penetration region 154 for penetrating at least part of the metal film, and the printed layer 153 is exposed to the outside through the penetration region 154. For example, the penetration region 154 includes a through hole 154a, and the through hole 154a penetrates the metal film 152 and forms a predetermined pattern 142 on a surface of the metal film 152. The pattern 142 formed by the through hole 154a becomes a pattern 142 illustrating a different color sense from the base color on a surface of the cover. According to the structure, the base color becomes a color with metallic texture, and the color of the pattern 142 becomes a color of the printed layer 153, and the case of a mobile terminal may include a pattern having various colors together with the feeling of metallic texture.

Referring to FIG. 4, the penetration region 154 is formed at a position deviated from a curved surface 141a, 141b of the case 141. More specifically, the curved surface 141a, 141b of the case 141 is formed on at least one of both ends of the case 141, and the penetration region 154 is disposed between both ends of the case 141. According to the structure, the production reliability for a curved surface may be enhanced.

Figure 6A:
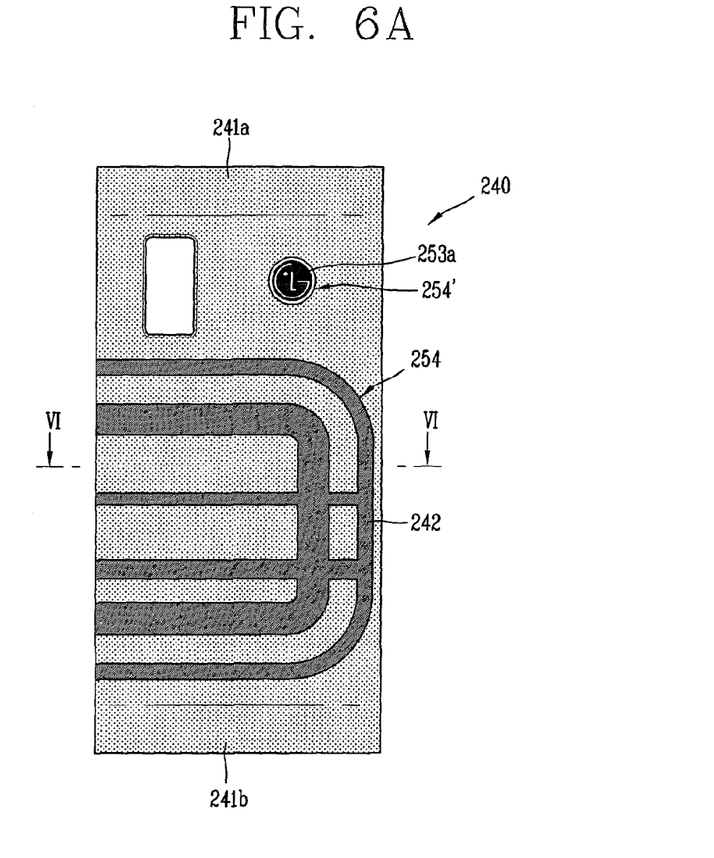
FIG. 6A is a rear view of a battery cover illustrating a mobile terminal according to another embodiment of the present invention.
Figure 6B:
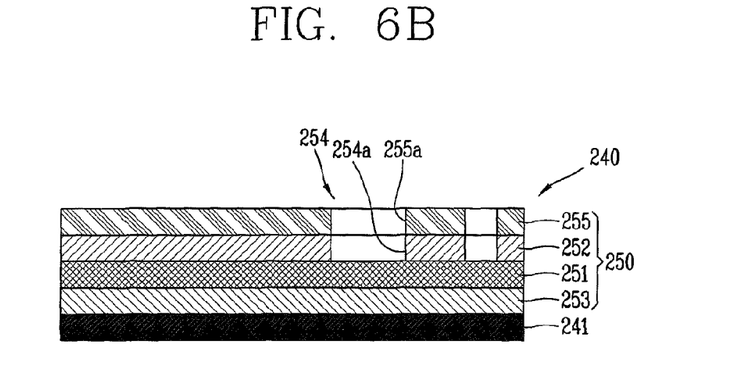
FIG. 6B is a cross-sectional view taken along the line VI-VI of FIG. 6A.

FIG. 6A is a rear view of a battery cover illustrating a mobile terminal according to another embodiment of the present invention, and FIG. 6B is a cross-sectional view taken along the line VI-VI of FIG. 6A.

According to the drawing, a film member 250 may include an oxide film 255 formed on a surface of the metal film 252. The oxide film 255 may be formed by anodizing a surface of the metal film 252.

The oxide film 255 is penetrated through a portion corresponding to a penetration region 254 of the metal film 252 to expose a printed layer 253. For example, an oxide film through hole 255a is also formed on the oxide film 255, and the oxide film through hole 255a forms the same or similar pattern to a pattern 242 formed by the through hole 254a penetrating the metal film 252.

Referring to FIG. 6A, the oxide film 255 and printed layer 253 may be formed with different colors. For example, the oxide film 255 is formed with black by black anodizing, but the printed layer 253 may be formed with gray by gray ink. Through this, a gray pattern over a black base may be formed on an outer surface of the cover 240. Furthermore, the feeling of depth due to a phase difference between the printed layer 253 and oxide film 255 may be formed on the cover 240 in the thickness direction.

In addition, a predetermined pattern 253a may be formed on the printed layer 253. As illustrated in the drawing, the predetermined pattern 253a may be a logo, and the boundary of a portion 254' corresponding to the pattern of the penetration region 254 forms a loop limiting the predetermined pattern 253a. More specifically, the pattern 253a may be disposed within a portion 254' limited by a closed loop of the penetration region 254, and through this, the user can recognize the pattern 253a formed on a printed layer.

Figure 7A:
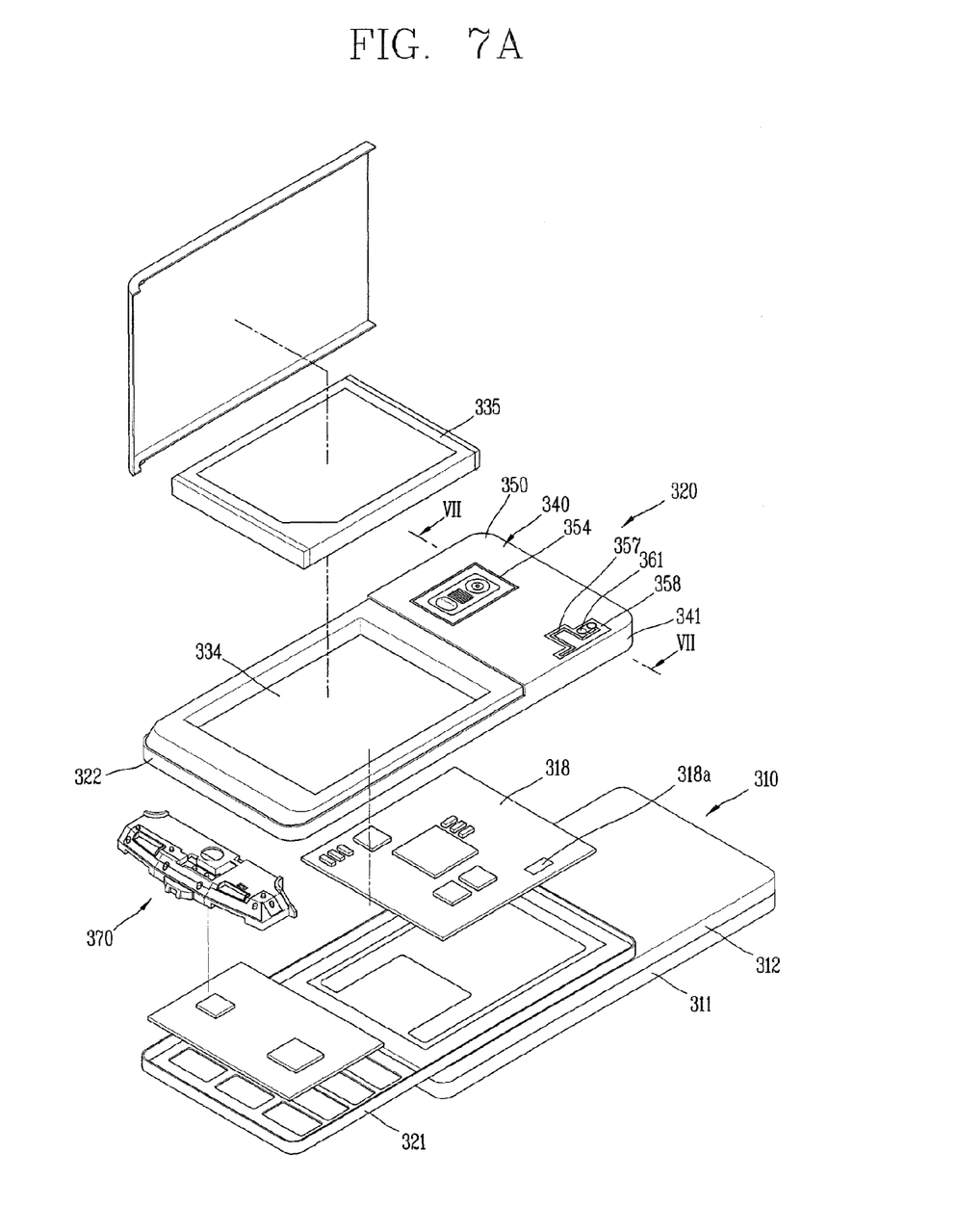
FIG. 7A is a rear view of a battery cover illustrating a mobile terminal according to still another embodiment of the present invention.
Figure 7B:
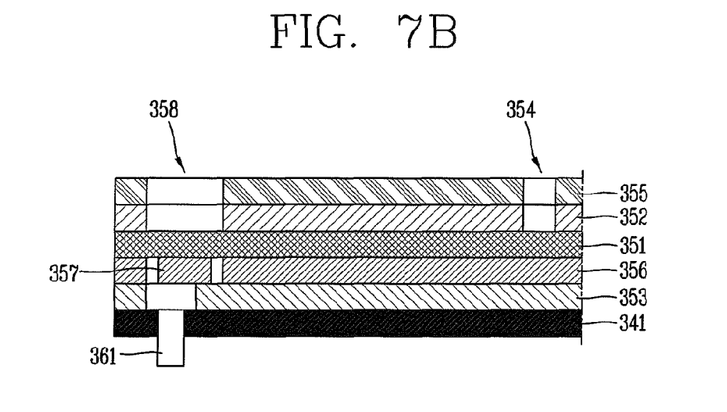
FIG. 7B is a cross-sectional view taken along the line VII-VII of FIG. 7A.

FIG. 7A is a rear view of a battery cover illustrating a mobile terminal according to still another embodiment of the present invention, and FIG. 7B is a cross-sectional view taken along the line VII-VII of FIG. 7A.

Referring to FIG. 7A, a case 341 associated with the present invention becomes a body of the rear case 322, and therefore, a film member 350 is disposed on a surface of the rear case 322. An antenna device 370 is disposed at an end portion of the front case 321, and connected to a circuit board 318 to perform wireless communication.

Referring to FIG. 7B, a second metal film 356 is mounted on the other surface of the base film 351 (a surface opposite to the surface combined with the first metal film 352). The second metal film 356 together with the first metal film 352 may be adhered to both surfaces of the base film 351 by lamination. A printed layer 353 is formed on the second metal film 356, and an oxide film 355 is formed on a surface of the first metal film 352, and at least part of the oxide film 355 is penetrated to correspond to the first penetration region 354.

Referring to FIGS. 7A and 7B, an antenna pattern 357 is formed on the second metal film 356 to transmit and receive wireless signals, and a second penetration region 358 is formed on the first metal film 352 to correspond to the antenna pattern 357. Through this, an oxide film 355 is covered on a front surface thereof, and a film member 350 disposed with the antenna pattern 357 is implemented on a rear surface thereof. Furthermore, the antenna pattern 357 is not blocked through the second penetration region 358 in the radiation direction of electromagnetic waves, thereby enhancing the performance of transmitting and receiving a signal of the antenna pattern 357.

A connecting pin 361 with a conductive material is disposed to penetrate the case 341, thereby electrically connecting the antenna pattern 357 to the circuit board 318 for processing wireless signals. The connecting pin 361 is formed in such a manner that an end thereof is connected to the antenna pattern 357, and the other end thereof is connected to the circuit board 318. Furthermore, the other end of the connecting pin 361 is formed to elastically press the connection terminal 318a provided on the circuit board 318. The connecting pin 361 may be a pogo pin or the like, for example, in which the other end thereof is moved by an elastic body. An electrical connecting path is formed between the circuit board 318 and antenna pattern 357 as the connecting pin 361 presses the connection terminal 318a.

A plurality of connecting pins 361 may be provided to form, for example, grounding and feeding paths to the circuit board 318. Either one of the electrical connecting paths is a grounding path, and the other one is a feeding path, and through this, the antenna pattern 357 may be a planar inverted-F (PIFA) radiation pattern.

Figure 7C:
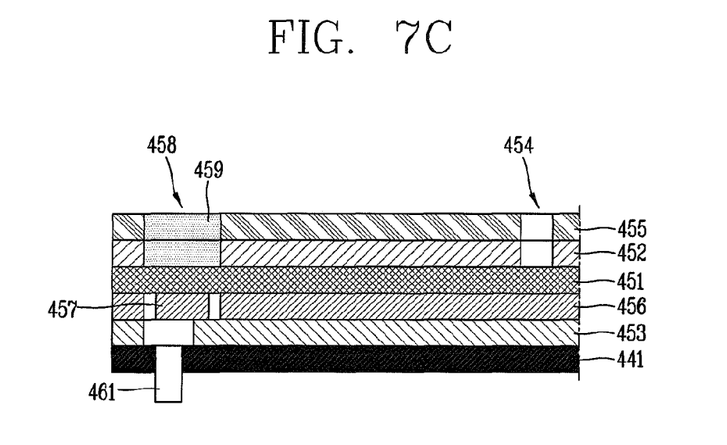
FIGS. 7C and 7D are cross-sectional views illustrating a modified example of a film member in FIG. 7B.
Figure 7D:
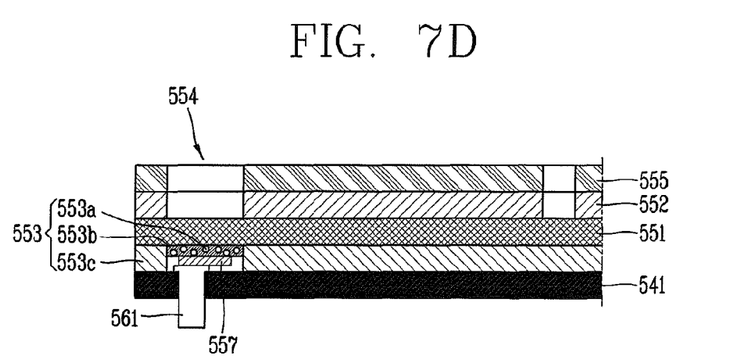

FIGS. 7C and 7D are cross-sectional views illustrating a modified example of a film member in FIG. 7B.

Referring to FIG. 7C, the second penetration region 458 is filled by paint or ink to cover at least one of the antenna pattern 457 and connecting pin 461. The filling is implemented by painting or printing, and though this, a filled layer 459 is formed. A portion corresponding to the antenna pattern 457 on the cover 440 may be covered with a different color from the color of the pattern.

Referring to FIG. 7D, a second metal film 556 is formed on a surface of the printed layer 553.

The printed layer 553 contains a conductive body 553a to allow plating on an outer surface of the base film 551. The conductive body 553a may be copper (Cu), silver (Ag), or the like. The base film 551 is formed of a non-conductive synthetic resin, and thus the printed layer 553 is formed to allow plating on the non-conductive material through the conductive body 553a.

The second metal film 556 is plated on the printed layer 553, and forms an antenna pattern 557 to transmit and receive wireless signals on a surface of the printed layer 553. The printed layer 553 may be divided into a portion 553b containing a conductive body and a portion 553c with no conductive body to form the antenna pattern 557. It may be implemented by multi-layer printing.

According to the drawing, the antenna pattern 557 is not exposed to the outside. Furthermore, the antenna pattern 557 may be formed at a position corresponding to the first penetration region 554, and through this, the performance of radiating electromagnetic waves are not affected by the first metal film 552.

Figure 8:
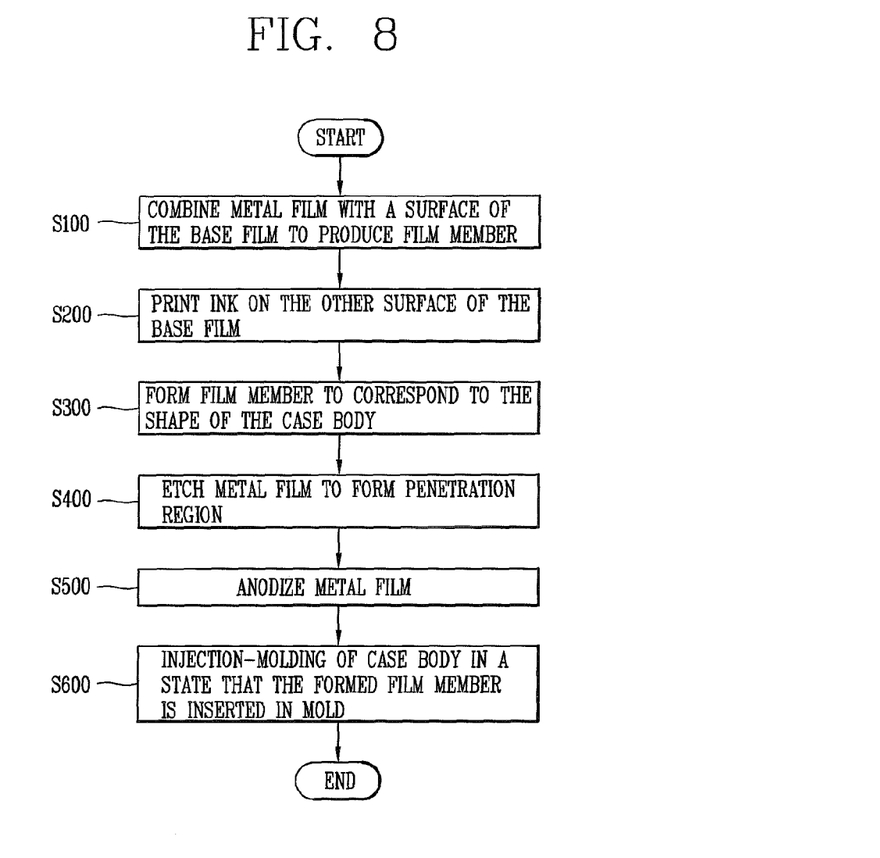
FIG. 8 is a flow chart illustrating a method of manufacturing a mobile terminal case associated with the present invention.

Hereinafter, a mobile terminal case, and a method of manufacturing the case applicable to a mobile terminal having the same as described above. FIG. 8 is a flow chart illustrating a method of manufacturing a mobile terminal case associated with the present invention, and FIGS. 9A through 9D are conceptual views illustrating each step of the manufacturing method in FIG. 8.

Referring to the drawings, first, a metal film having a metallic material is combined with a surface of the base film with a synthetic resin material using lamination to produce a film member (S100).

Figure 9A:
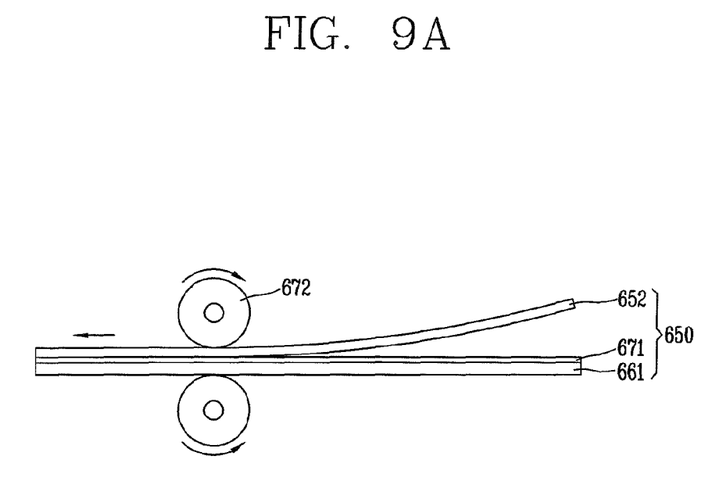
FIGS. 9A through 9D are conceptual views illustrating each step of the manufacturing method in FIG. 8.

The base film may be a light transmittance material, such as PC or PET film. The metal film may be an aluminum film, for example. Referring to FIG. 9A, a film member 650 is produced by coating a laminating binder 671 on a surface of the base film 661, and covering a metal film 652, and then compressing both of them through a roller 672 and the like.

Figure 9B:
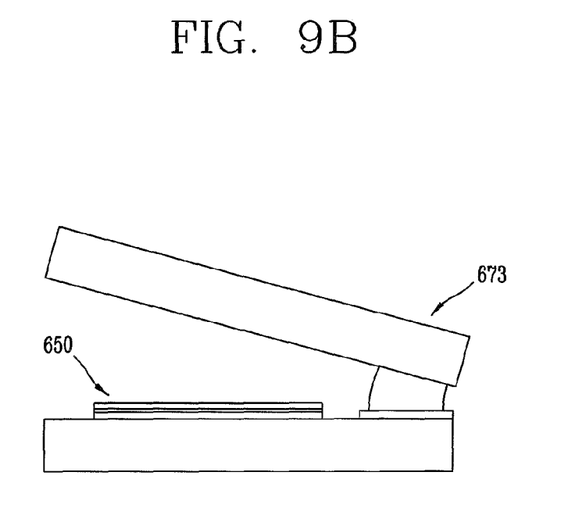

Referring to FIG. 8 again, ink is printed on the other surface of the base film to form a printed layer on the base film (S200). The printing is implemented through a pad printer 673 as illustrated in FIG. 9B, but it may be implemented through spray printing or the like.

Next, the film member is formed to correspond to a shape of the case (S300).

Figure 9C:
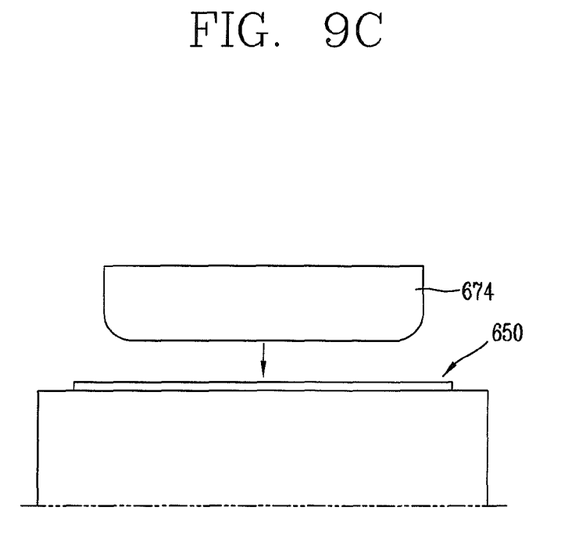

The forming step (S300) may be a step of pressing the film member to correspond to the exterior of the case. As illustrated in FIG. 9C, it may be formed a shape corresponding to a curved surface of the case as a press mold 674 presses the film member 650.

Next, the metal film is etched to form a penetration region exposing a printed layer to the outside (S400), and the metal film is anodized to form an oxide film on a surface of the metal film (S500). In the anodizing step (S500), the designer can paint his or her desired color on a surface of the metal film.

For example, the etching step (S400) and the anodizing step (S500) are sequentially performed in the order of etching, brushing, placing in a jig, removing fat, washing, NaOH, neutralization, anodizing, coloring, sealing and rinsing.

Figure 9D:
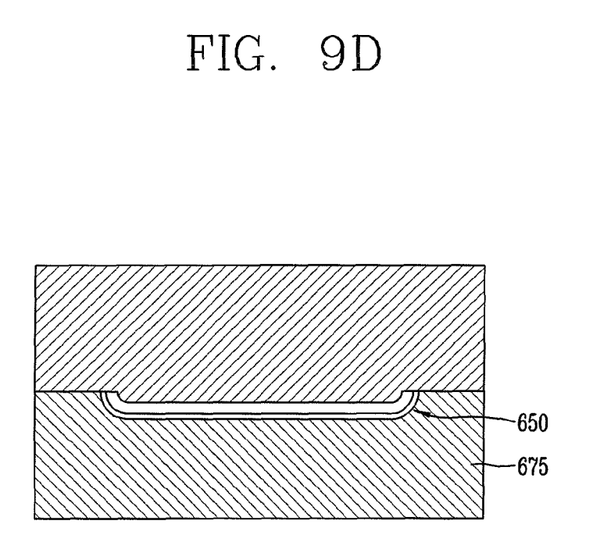

Finally, the case is injection-molded in a state that the formed film member is inserted in a mold (S600). Referring to FIG. 9D, the film member 650 is inserted in a mold 675 for injection, and integrated into a case by injecting the case.

In this manner, a case can be manufactured by injection-molding through a film member consisted of the metal film and base film, thereby implementing a method of manufacturing a case capable of maintaining metallic texture while increasing a degree of freedom of the mobile terminal.

Figure 10:
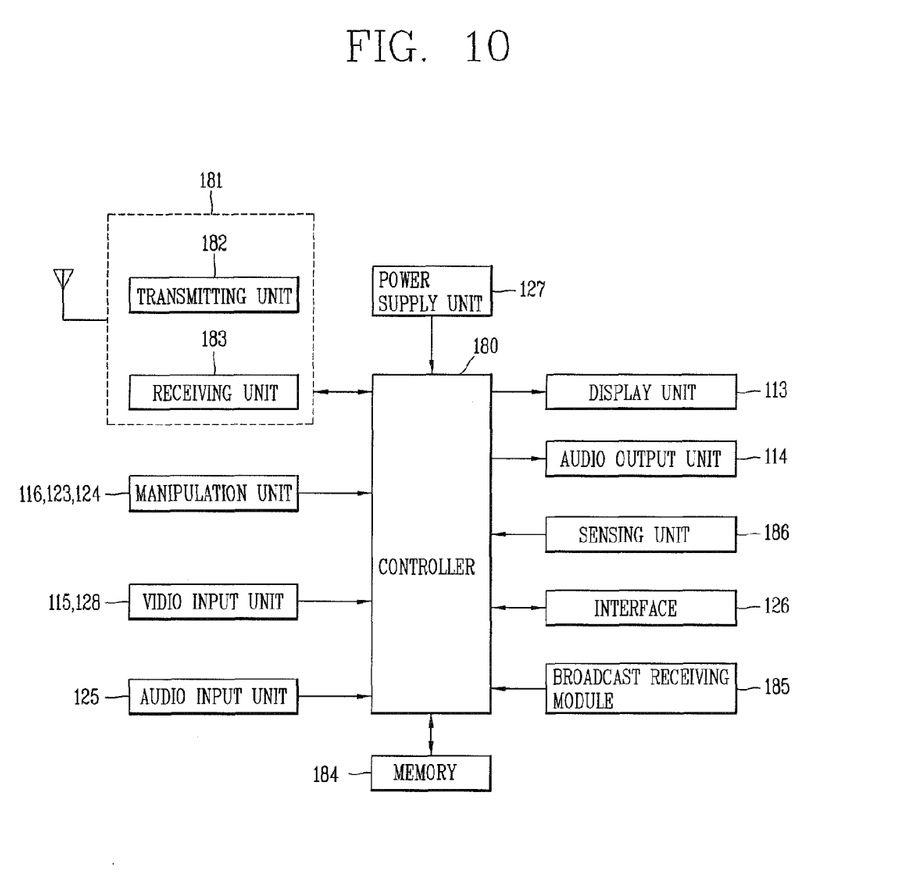
FIG. 10 is a block diagram illustrating a mobile terminal associated with the present invention.

FIG. 10 is a block diagram illustrating a mobile terminal associated with the present invention.

Referring to FIG. 10, a mobile terminal according to an embodiment of the present invention may include a wireless communication module 181, manipulation units 116, 123 and 124, video input units 115 and 128, an audio input unit 125, a display unit 113, audio output unit 114, a sensing unit 186, an interface 126, a broadcast receiving module 185, a memory 184, a power supply unit 127, and a controller 180.

The controller 180 may control an overall operation of the mobile terminal. For example, the controller 180 may perform related control and processing for a voice call communication, data communication, telephony communication and the like.

Also, the controller 180 may control the operation of a mobile terminal according to the present invention in addition to a typical function control.

The wireless communication module 181 may transmit and/or receive radio signals to and/or from a mobile communication base station via an antenna. For example, the wireless communication module 181 manages the transmission and reception of audio data, text data, video data and control data under the control of the controller 180. To this end, the wireless communication module 181 may include a transmitting unit 182 for modulating and transmitting a signal to be sent, and a receiving unit 183 for demodulating a signal received.

The manipulation units 116, 123, 124 may be configured, as shown in FIG. 1, thus to provide the controller 180 with key input data input by a user to control the operations of the mobile terminal. The manipulation units 116, 123, 124 may include a dome switch, a touchpad (e.g., static pressure/capacitance), a jog wheel, a jog switch and the like.

The video input units 115 and 128 process image frames of still images or video obtained by an image sensor in a video call mode or a capturing mode. Such processed image frames are converted into image data displayable on the display unit 113 to be then output on the display unit 113.

The image frames processed by the video input units 115 and 128 may be stored in the memory 184 under the control of the controller 180 or be sent to the exterior via the wireless communication module 181.

The audio input unit 125 receives an external audio signal via a microphone while the mobile terminal is in a particular mode, such as phone call mode, recording mode and voice recognition. This audio signal is processed and converted into digital data. Such processed digital data is converted into a data format transmittable to a mobile communication base station via the wireless communication module 181 when the mobile terminal is in the phone call mode, and then outputted to the wireless communication module 181. The processed digital data may be stored in the memory 184 in a recording mode.

The audio input unit 125 may include various noise removing algorithms to remove noise generated in the course of receiving the external audio signal.

The display unit 113 displays information processed in the mobile terminal. For example, when the mobile terminal is in a phone call mode, the display unit 113 displays User Interface (UI) or Graphic User Interface (GUI) related to the call under the control of the controller 180. If the display unit 113 includes a touch screen, then it may be used as an input device as well as an output device.

The audio output unit 114 may convert audio data received from the wireless communication module 181 or audio data stored in the memory 184 under the control of the controller 180 when the mobile terminal is in a call-receiving mode, a phone call mode, a recording mode, a voice recognition mode, or a broadcast receiving mode. Such converted audio data is then outputted to the exterior.

The audio output unit 114 also outputs an audio signal associated with a function (e.g., outputting a call receiving sound, a message receiving sound, or the like) performed in the mobile terminal. Such audio output unit 114 may include a speaker, a receiver, a buzzer and the like.

The sensing unit 186 may detect the current status of a mobile terminal, such as an open or closed configuration of the mobile terminal, a position of the mobile terminal, a presence or absence of the user contact with the mobile terminal and the like, thereby generating a sensing signal for controlling the operation of the mobile terminal. For example, the sensing unit 186 senses the open or closed configuration of a slide type mobile terminal, and outputs the sensed result to the controller 180, thereby allowing the operation of the mobile terminal to be controlled. Other examples include the sensing unit 186 sensing the presence or absence of power provided by the power supply unit 127, the presence or absence of a coupling or other connection between the interface 126 and an external device.

The interface 126 is often implemented to couple the mobile terminal with external devices. Typical external devices include wired/wireless headphones, external chargers, wired/wireless data ports, card sockets (e.g., memory card, SIM/UIM card or the like) and the like. The interface 126 may allow the mobile terminal to receive data or power from external devices and transfer such data or power to each component inside the mobile terminal, or transmit internal data of the mobile terminal to external devices.

The memory 184 may store a program for the control and processing of the controller 180, or temporarily store input/output data (e.g., phone book data, messages, still images, video, or the like).

Also, the memory 184 may store a program for controlling the operation of the mobile terminal according to the present invention.

The memory 184 may include typically known hard disk, a card-type memory (e.g., SD or XD memory), a flash memory, RAM, ROM and the like.

The broadcast receiving module 185 may receive a broadcast signal transmitted via satellites or terrestrial waves and convert such broadcast signal into a broadcast data format capable of being output to the audio output unit 114 and the display unit 113 so as to output the converted signal to the controller 180. The broadcast receiving module 185 may also receive additional data associated with broadcasting (e.g., Electric Program Guide (EPG), channel list, or the like). The broadcast data converted in the broadcast receiving module 185 and the additional data may be stored in the memory 184.

The power supply unit 127 provides power required by the various components for the mobile terminal. The provided power may be internal power, external power, or combinations thereof.

According to the present invention having the foregoing configuration, a plurality of color senses may be implemented through an oxide film and a printed layer disposed at both surfaces of the base film. Furthermore, the feeling of depth due to a phase difference between the printed layer and the oxide film may be formed on such a cover.

Furthermore, according to the present invention, there is provided a mobile terminal case for which film insert injection molding can be more easily implemented through a film member consisted of the metal film and base film. In addition, a case can be manufactured by injection-molding, thereby implementing a case manufacturing method with an increased degree of freedom in the shape of a mobile terminal, weight reduction and production cost reduction.

Moreover, according to the present invention, color sense is formed on the outer surface thereof, and an antenna pattern is disposed on an inner surface thereof, thereby allowing the antenna pattern to be integrated with a case in a mobile terminal.

The mobile terminal as described above is not limited to the configurations and methods of the foregoing embodiments, but all or part of each embodiment may be selectively combined with each other so as to implement various modifications of the embodiments.

What is claimed is:
1. A mobile terminal, comprising:
   a case having a curved surface and forming an external shape of the mobile terminal;
   a film member mounted on the case, wherein the film member comprises:
      a base film combined with the case and made of a synthetic resin material; and
      a first metal film mounted on a first surface of the base film, wherein a first penetration region for penetrating at least a portion of the first metal film is formed on the first metal film and at least a portion of the first metal film is formed to correspond to the curved surface of the case;

a printed layer formed on a second surface of the base film and located between the base film and the case such that the printed layer is exposed through the first penetration region;

an oxide film formed on a surface of the first metal film; and a through hole formed on a portion of the oxide film corresponding to the first penetration region such that the printed layer is exposed through the first penetration region and the through hole.

2. The mobile terminal of claim 1, wherein the first penetration region comprises a through hole that penetrates the first metal film and forms a predetermined pattern on a surface of the first metal film.

3. The mobile terminal of claim 1, wherein:
the first metal film is formed to cover the curved surface of the case; and
the first penetration region is located at a position away from the curved surface of the case.

4. The mobile terminal of claim 1, wherein the printed layer comprises a conductor and further comprising:
a second metal film comprising an antenna pattern mounted on a surface of the printed layer in order to transmit and receive wireless signals; and
a second penetration region formed on the first metal film to correspond to the antenna pattern.

5. The mobile terminal of claim 1, further comprising:
a predetermined pattern formed on the printed layer; and
a loop for limiting the predetermined pattern, the loop formed by a boundary of a portion corresponding to a pattern formed by the first penetration region.

6. The mobile terminal of claim 1, further comprising:
a second metal film comprising an antenna pattern mounted on the second surface of the base film in order to transmit and receive wireless signals; and
a second penetration region formed on the first metal film to correspond to the antenna pattern.

7. The mobile terminal of claim 6, further comprising:
a connecting pin penetrating the case and comprising a conductive material for electrically connecting the antenna pattern to a circuit board for processing the wireless signals.

8. The mobile terminal of claim 7, wherein the second penetration region is filled with paint or ink in order to cover at least the antenna pattern or the connecting pin.

9. The mobile terminal of claim 1, wherein:
the film member further comprises an adhesive layer interposed between the base film and first metal film; and
the base film is adhered to the first metal film by the adhesive layer.

10. The mobile terminal of claim 1, further comprising a boundary surface formed between the base film and the case when the base film and the case are combined with each other.

11. The mobile terminal of claim 10, wherein the printed layer comprises a binder resin for adhering the base film to the case.

12. A mobile terminal, comprising:
a case having a curved surface and forming an external shape of the mobile terminal;
a film member mounted on the case, wherein the film member comprises:
a base film made of a synthetic resin material and integrated with the case such that the base film covers the case; and
a metal film mounted on a first surface of the base film, wherein a first penetration region for penetrating at least a portion of the metal film is formed on the metal film and at least a portion of the metal film formed to correspond to the curved surface of the case;
a printed layer formed on a second surface of the base film and located between the base film and the case such that the printed layer is exposed through the first penetration region;
an oxide film formed on a surface of the metal film; and
a through hole formed on a portion of the oxide film corresponding to the first penetration region such that the printed layer is exposed through the first penetration region and the through hole.

13. A mobile terminal, comprising:
a case having a curved surface and forming an external shape of the mobile terminal; and
a film member mounted on the case,
wherein the film member comprises:
a base film combined with the case and made of a synthetic resin material; and
a first metal film mounted on a first surface of the base film, wherein a first penetration region for penetrating at least a portion of the first metal film is formed on the first metal film and at least a portion of the first metal film formed to correspond to the curved surface of the case; and
a printed layer formed on a second surface of the base film and located between the base film and the case such that the printed layer is exposed through the first penetration region,
wherein the base film comprises a light transmittance material,
wherein the printed layer comprises:
a conductor;
a second metal film comprising an antenna pattern mounted on a surface of the printed layer in order to transmit and receive wireless signals; and
a second penetration region formed on the first metal film to correspond to the antenna pattern.

14. The mobile terminal of claim 13, wherein the film member further comprises an oxide film formed on a surface of the first metal film.

15. The mobile terminal of claim 14, further comprising a through hole formed on a portion of the oxide film that corresponds to the first penetration region such that the printed layer is exposed through the first penetration region and the through hole.

* * * * *